United States Patent Office 3,610,126
Patented Oct. 5, 1971

---

3,610,126
OBJECTIVE SHUTTER AND LENS ATTACHMENT FOR A CAMERA HAVING A FOCAL PLANE SHUTTER
Bodo Mielke, Braunschweig, Germany, assignor to Rollei-Werke Franke & Heidecke, Braunschweig, Germany
Filed Oct. 11, 1968, Ser. No. 766,842
Claims priority, application Germany, Oct. 14, 1967, P 15 97 387.2
Int. Cl. G03b 19/12, 9/28
U.S. Cl. 95—42                                9 Claims

ABSTRACT OF THE DISCLOSURE

A detachable optical unit including a lens, an objective shutter, and an adjustable diaphragm, for use in association with a single lens mirror reflex camera having a pivoted mirror and a focal plane shutter. The movable control part on the camera which normally serves to control the full opening and partial closing movements of a conventional diaphragm unit attached to the camera, serves in the present construction not only to control such movements of the diaphragm in the present optical unit, but also to initiate the exposure cycle of the objective shutter built into the optical unit, if the objective shutter has previously been tensioned. If the objective shutter has not been tensioned, its blades remain open, and the exposure is made by the focal plane shutter built into the camera.

BACKGROUND OF THE INVENTION

Single lens reflex cameras are well known in the art, and exist in many makes and models. Some of them employ focal plane shutters; an example of this is the "Leica" camera widely used in many countries. Other single lens reflex cameras use an objective shutter; an example of this is the camera disclosed in Singer Pat. No. 3,122,078, issued Feb. 25, 1964. Many people prefer to use a camera with a focal plane shutter wherever possible. However, it is usually not practical to use a focal plane shutter if one is using a flash bulb with the "fill-in" technique, that is, a picture taken in daylight but with flash used to lighten some of the deep shadows. If it is attempted to use a focal plane shutter with fill-in flash, then either it is necessary to use a special type of flash bulb providing an extra long period of illumination, or it is necessary to set the timing of the focal plane shutter for a relatively long exposure, to make sure that the entire exposure area of the film is exposed while the flash is occurring. This latter solution avoids the use of special flash bulbs, but it may seriously over expose those parts of the scene which are illuminated by daylight.

An object of the present invention is the provision of a camera of relatively simple and easily operated form, equipped with both a focal plane shutter and an objective shutter, so that either shutter may be used as desired.

Another object is the provision of a single lens hinged mirror reflex camera with both a focal plane shutter and an objective shutter, with the operating elements so designed that there are a minimum of settings or adjustments to be made and that the shift from the use of a focal plane shutter to an objective shutter, or vice versa, is accomplished easily and quickly.

Still another object is the provision of a singe lens mirror reflex camera with both focal plane shutter and objective shutter, so designed that the operating connections between the mechanism in the camera body and the mechanism in the shutter housing are the same connections which operate the iris diaphragm in synchronism with the movements of the hinged mirror and other parts within the camera body, so that no additional connections need be provided from the camera body to the objective shutter beyond those which are provided anyhow between the camera body and the iris diaphragm.

A further object is the provision of such a camera so designed that the objective shutter may be mounted either in an optical unit permanently connected to the camera or in an optical unit which is detachably and interchangeably mounted on the camera.

BRIEF DESCRIPTION OF THE DRAWINGS

In the accompanying drawings, incorporated herein by reference and constituting a material part of the disclosure and relating to an exemplary embodiment of the invention.

DESCRIPTION OF THE PREFERRED EMBODIMENT

It is well known in the art to have a camera body of the hinged mirorr reflex type, equipped with a focal plane shutter and with an optical unit (lens assembly and adjustable iris diaphragm) which has a rotatable ring on the optical unit for pre-selecting the size of the diaphragm aperture to be used when the exposure is made. It is also known in such cameras to have mechanism within the camera body, geared to or operating in synchronism with the mechanism which swings the mirror, for moving the iris diaphragm blades or leaves to fully open position for viewing the image, when the mirror in the camera body swings down to viewing position, and for releasing the diaphragm leaves when the mirror swings up to picture taking or exposure position, so that the conventional spring connected to the iris diaphragm leaves will close them down to the pre-selected aperture. These features above mentioned are known both in cameras in which the optical unit is permanently attached to the camera body, and in cameras in which the optical unit is a detachable and interchangeable unit. The known cameras having the above mentioned characteristics also include some cameras in which the swinging mirror stays in the picture-taking position after an exposure is made (the diaphragm also remaining stopped down to the preselected aperture) until the mechanism is tensioned or cocked ready for the next exposure, and other cameras in which the operating mechanism in the camera body is so designed that at the conclusion of the exposure, the hinged mirror swings down again to viewing position and the diaphragm is fully opened for viewing, without requiring another tensioning or cocking operation. In other words, in cameras of this last mentioned kind, the normal rest position of the parts, when the mechanism has run down through its cycle, is a position in which the mirror is in viewing position and the diaphragm is fully open. Then when the camera mechanism is tensioned or cocked ready for the next exposure, the mirror stays in viewing position and the diaphragm stays fully open. During the running down of the previously tensioned mechanism in the camera body, the mirror swings up to picture taking position, the diaphragm closes down to the preselected aperture, the shutter operates to make the exposure, the mirror swings down again to viewing position, simultaneously the diaphragm is opened fully, and the parts come to rest. It is to this latter kind of known camera that the present invention relates.

Since the camera itself is conventional and well known in the art, it is not necessary to describe it in detail and it is not shown in the present drawings. The only part of the camera mechanism (as distinguished from the optical unit or lens assembly) which is here shown, is the part which projects from the camera body into the vicinity of the optical unit, and which moves (through conventional mechanism in the camera body) to open the diaphragm wide at the proper time and to allow it to close down to the preselected aperture at the proper time. This part is schematically shown at 1 in the present drawings, and it is sufficient to say that, through the conventional mechanism in the camera body, this part 1 swings downwardly in a clockwise direction when the mirror in the camera body swings up to picture taking positon, and the part 1 swings upwardly again in a counterclockwise direction when the reflex mirror in the camera swings downwardly to viewing position. In the prior art cameras of this type, the swinging of the member 1 controls only the opening and closing movements of the diaphragm in the optical unit. According to the present invention, however, an objective shutter is included in the optical unit, as well as the adjustable diaphragm, and the parts of the diaphragm mechanism and the shutter mechanism are so designed and contrived that this same swinging member 1 serves to control certain operations of the objective shutter as well as the diaphragm. Thus, at least in the simplest form of the present invention, no additional connections are needed between the camera body and the optical unit containing an objective shutter therein, and a very simple, compact, and effective mechanism is provided.

It is recognized, of course, that it is old in the art to have an objective shutter, certain operations of which are controlled in synchronism with the swinging of a hinged mirror in a single lens reflex camera, one example of this being the above mentioned Patent 3,122,078. However, in the construction shown in this patent, and in other similar constructions, the objective shutter is the only shutter used in the camera. Such constructions do not deal with the problem solved by the present invention. The present invention starts with a single lens reflex camera with a hinged mirror and with a focal plane shutter, and adds to this an objective shutter for alternate use, and solves the problem of controlling the objective shutter in the optical unit through the same simple mechanism which such cameras have previously employed for controlling the opening and closing of the adjustable diaphragm, without in any way detracting from the use of such mechanism for still controlling the diaphragm in addition to performing the further function of controlling the objective shutter. The present invention, moreover, is applicable to objective shutters in optical units permanently attached to the camera body, as well as to objective shutters in optical units which are detachably and interchangeably mounted on the camera body. In fact, since no change is needed in the moving part on the camera body which projects into the vicinity of the optical unit and serves to control the opening and closing of the diaphragm, it follows that if the camera is equipped to receive an interchangeable optical unit containing only a diaphragm, an interchangeable optical unit according to the present invention, con- taining both a diaphragm and an objective shutter, may be placed on the camera instead of the originally intended optical unit. Thus many cameras intended originally for use exclusively with the built-in focal plane shutter, may now be equipped additionally with an objective shutter for alternate use, without requiring any change in the pre-existing structure of the camera.

Figure 6:
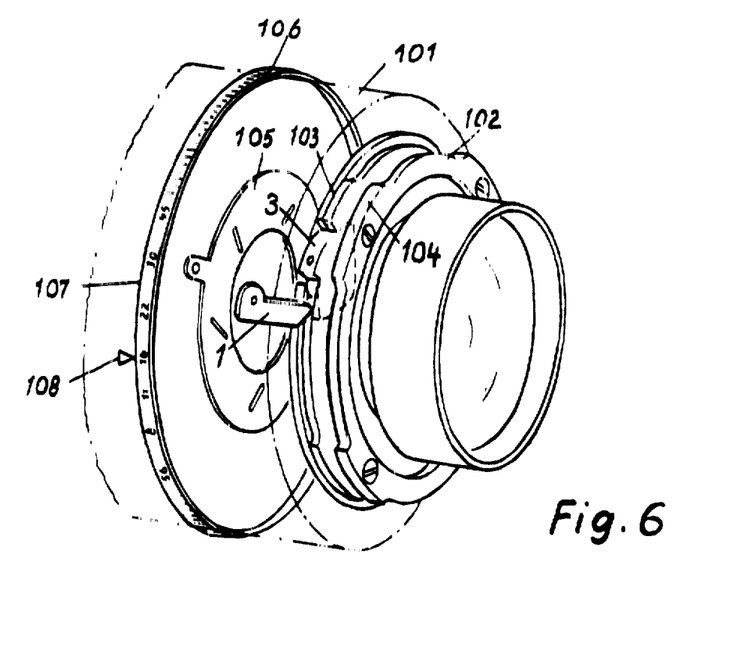
FIG. 6 is a perspective view from the rear of a detachable and interchangeable optical unit in accordance with a preferred form of the present invention.

An interchangeable optical unit according to the present invention, containing not only the lens components but also the adjustable diaphragm and the objective shutter, is shown fragmentarily and schematically in FIG. 6. The mount or main body of the unit is indicated at 101. It has a bayonet mounting ring 102 having bayonet lugs 103 and 104 for mounting the unit detachably on the front of the camera body in the customary way, moving the unit axially until the lugs 103 and 104 enter mating parts of the bayonet mounting on the front of the camera, then twisting the unit to rotate it about the optical axis to lock the bayonet lugs on the unit with the bayonet lugs on the camera body, in the way familiar in the art.

In this optical unit a diaphragm aperture setting ring 105 is rotatably mounted, and is connected to turn with a diaphragm aperture pre-selecting ring 106 rotatable on the periphery of the unit and having a knurled surface for easy grasping. A diaphragm aperture scale 107 on a portion of the ring is read in conjunction with an index mark or reference point 108 on the body of the optical unit. These parts of the optical unit, as well as various other parts not further described herein, are conventional and may be widely varied within the skill of the art, the specific details being not important for purposes of the present invention.

The above mentioned part 1 movably mounted on the camera body is not part of the detachable and interchangeable optical unit, but nevertheless this part 1 is indicated schematically in FIG. 6 for the sake of showing its relationsip to the pivoted part 3 which is part of the optical unit. When the interchangeable unit 101 is twisted onto the bayonet mount at the front of the camera, in a clockwise direction when viewed from the front or in a counterclockwise direction when viewed from the rear as in FIG. 1, the pivoted part 3 is brought up against the part 1 and assumes a position dependent upon the position of the part 1. A similar relationship between the parts 1 and 3 exists if the optical unit is permanently attached to the camera rather than being mounted by means of a detachable bayonet connection.

Figure 1:
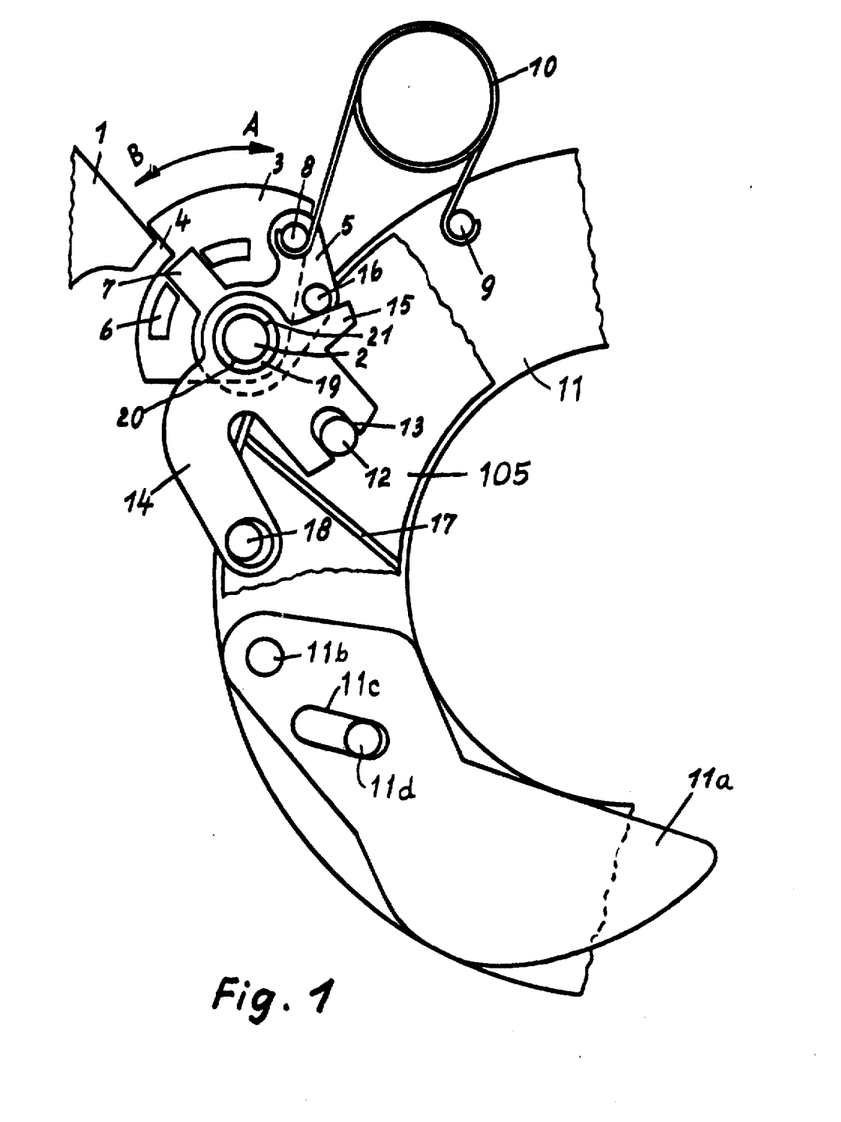
FIG. 1 is a fragmentary face view of certain driving and control parts mounted in the optical unit, for driving and controlling the objective shutter and the adjustable diaphragm, together with a fragment of the part on the camera body which cooperates with these driving and control parts on the optical unit.

Referring now to FIG. 1, further details of the interior construction of the optical unit are shown schematically. The pivoted part 3 is pivoted on a pin 2 in the optical unit, and has a radial step 4 which engages the part 1 on the camera body. Mounted on the same pivot 2 is a lever 5 which overlies the pivoted disk 3 and is coupled to it by means of an arm 7 on the lever 5 engaged somewhat loosely between a pair of projections 6 on the member 3. A pin 8 on the lever 5 is engaged by one end of a hairpin spring 10, the other end of which engages a pin 9 on the iris diaphragm actuating ring 11 which is rotatable about the optical axis passing through the center of the optical unit. In the conventional manner well known in the art, the ring 11 is coupled to the iris diaphragm leaves 11a. There are several such leaves arranged at intervals around the periphery of the exposure aperture, but only one diaphragm leaf 11a is here shown, for the sake of clarity. Merely as an example of a conventional way of coupling the leaves to the ring 11, each leaf may be mounted on a fixed pivot 11b and may have a slot 11c engaged by a pin 11d on the ring 11. As the ring 11 turns in a clockwise direction (viewed as in FIG. 1) the leaves close, and when the ring 11 turns counterclockwise, the leaves open.

To control the movements of the ring 11, the ring has a pin 12 engaged by a fork 13 on a lever 14 pivoted on the same pivot 2 on which the members 3 and 5 are pivoted. One arm 15 of this lever 14 has a radial shoulder engaging a pin 16 on the lever 5, so that the lever 14 can swing in a counterclockwise direction relative to the lever 5 only until the arm of the former comes in contact wth the pin 16 of the latter.

To limit the extent to which the lever 14 may turn counterclockwise (when permitted to do so by the position of the lever 5) there is a stop member 17 on the diaphram setting ring 105 which was previously mentioned in connection with FIG. 6, and which is manually settable to the pre-selected aperture size. This stop member 17 lies in the path of movement of a pin 18 on one arm of the lever 14. For the sake of accurate adjustment for calibration, the pin 18 is preferably an eccentric pin as illustrated, seated in an opening in the lever 14 and turnable for adjustment.

In the parts thus far described in connection with FIG. 1, the spring 10 tends to turn the aperture adjusting ring 11 in a clockwise direction and to turn the lever 5 in a counterclockwise direction. Since the lever 5 is coupled to the pivoted member 3 by means of the arm 7, the lever 5 can turn counterclockwise no further than permitted by the position of the member 3, and the position of the latter is determined by the position of the part 1 on the camera body. As previously indicated, the part 1 swings up or counterclockwise (about a pivot not shown in FIG. 1) to the position illustrated in FIG. 1 when the mirror in the camera is in its down or viewing position. Therefore, when the mirror is in viewing position, the member 3 in the optical unit is in the position shown in FIG. 1, and can turn no further in a counterclockwise direction notwithstanding the pressure exerted by the spring 10 on the lever 5 and by the lever 5 on the member 3. The pin 16 on the lever 5 thus holds the lever 14 in the position illustrated in FIG. 1, notwithstanding the fact that the pressure of the other end of the spring 10 is tending to move the ring 11 clockwise and thereby, through the pin 12 on the ring 11, tending to move the lever 14 counterclockwise. The ring 11 is thus at its counterclockwise limit of motion, and the diaphragm leaves 11a are fully open, so that maximum light comes through the lens and the diaphragm aperture and onto the reflex mirror of the camera and is reflected thereby onto the focusing screen, for maximum brilliance of viewing of the field of view.

Now when the conventional drive mechanism within the camera body has been tensioned or cocked in the conventional way and has been released or triggered for making an exposure, the hinged reflex mirror in the camera will be swung up out of the way, to the exposure or picture-taking position, and simultaneously the member 1 on the camera body will be swung down or clock wise about its pivot (not shown in FIG. 1, but shown schematically in FIG. 6) and this will allow the member 3 to turn (under the influence of the spring 10) in a counterclockwise direction on its pivot 2, that is, in the direction of the arrow B of FIG. 1. The lever 5 will, of course, turn with the member 3. Therefore the pin 16 on the lever 5 no longer holds the lever 14, and the lever 14 can now turn counterclockwise, under the influence of the second end of the spring 10 which is now able to move the ring 11 clockwise, carrying its pin 12 with it and thereby turning the lever 14. However, the extent to which the lever 14 can turn is limited by engagement of the pin 18 with the stop member 17 on the diaphragm setting ring or preselecting ring 105. The clockwise rotation of the diaphragm actuating ring 11 will move the diaphragm leaves 11a in a closing direction, but only so far as permitted by the preselected set position of the setting ring 105 controlled by the manually set preselector ring 106. In this way, the diaphragm leaves are closed down to the preselected aperture when the member 1 on the camera body moves concomitantly with movement of the mirror to its up or picture-taking position. Conversely, when the mirror in the camera body moves down to its viewing position, the member 1 on the camera body swings up and engages the shoulder 4 on the member 3, moving this member 3 back in the direction of the arrow A so that the parts are restored to the position shown in FIG. 1 and the diaphragm leaves 11a are fully opened for passage of maximum light for viewing.

Figure 2:
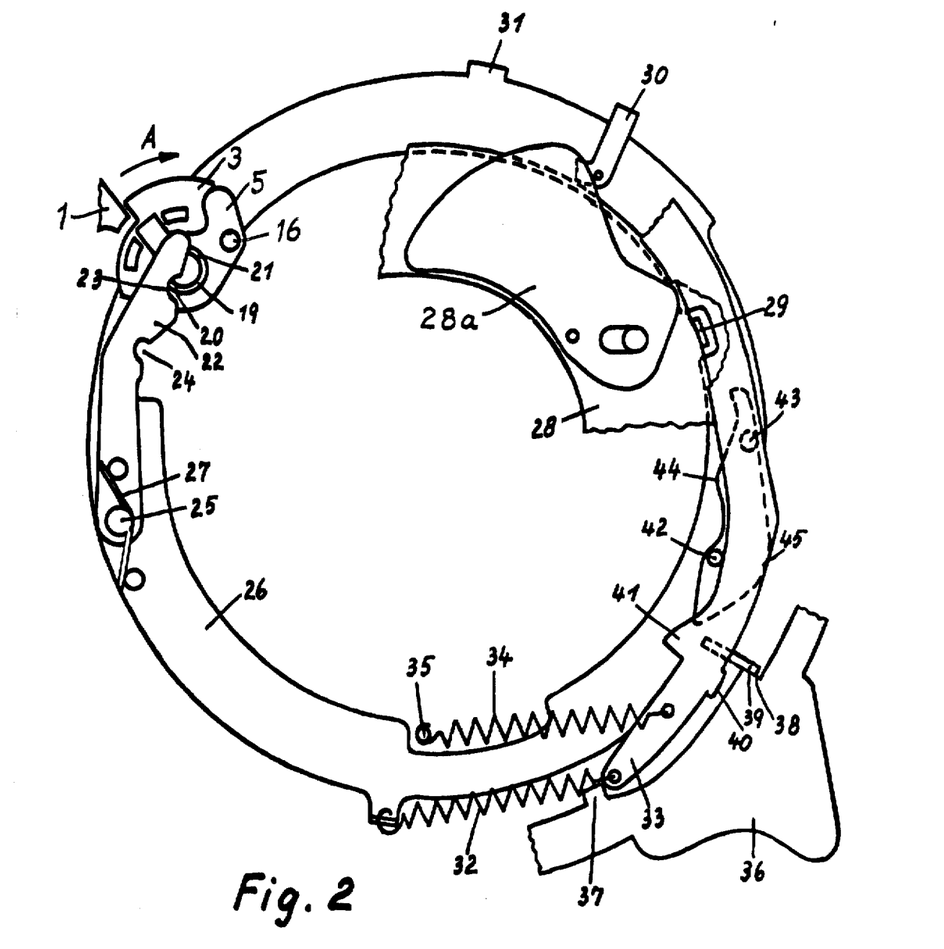
FIG. 2 is a view of some of the same parts shown in FIG. 1, but on a smaller scale, and some additional parts on the optical unit, illustrating the parts in the rest or run-down position assumed at the completion of an exposure cycle.

According to an important feature of the present invention, the optical unit is provided not only with the diaphragm leaves responsive to the movements of the member 3, but also with objective shutter blades controlled in part by movements of this same member 3 which controls the diaphragm leaves. As part of the means for controlling the objective shutter, the hub 19 of the lever 5 projects upwardly beyond the top of the lever 14, and the projecting part thereof is cut away throughout approximately half of its circumference, leaving edges 20 and 21 (FIGS. 1 and 2) which cooperate with and control the movements of a pivoted pawl 22 (FIG. 2). The pawl overlies the cutaway part of the hub 19 and has notches 23 and 24 for engagement with and release from the control edges 20 and 21 of the hub 19 as further explained below.

Figure 3:
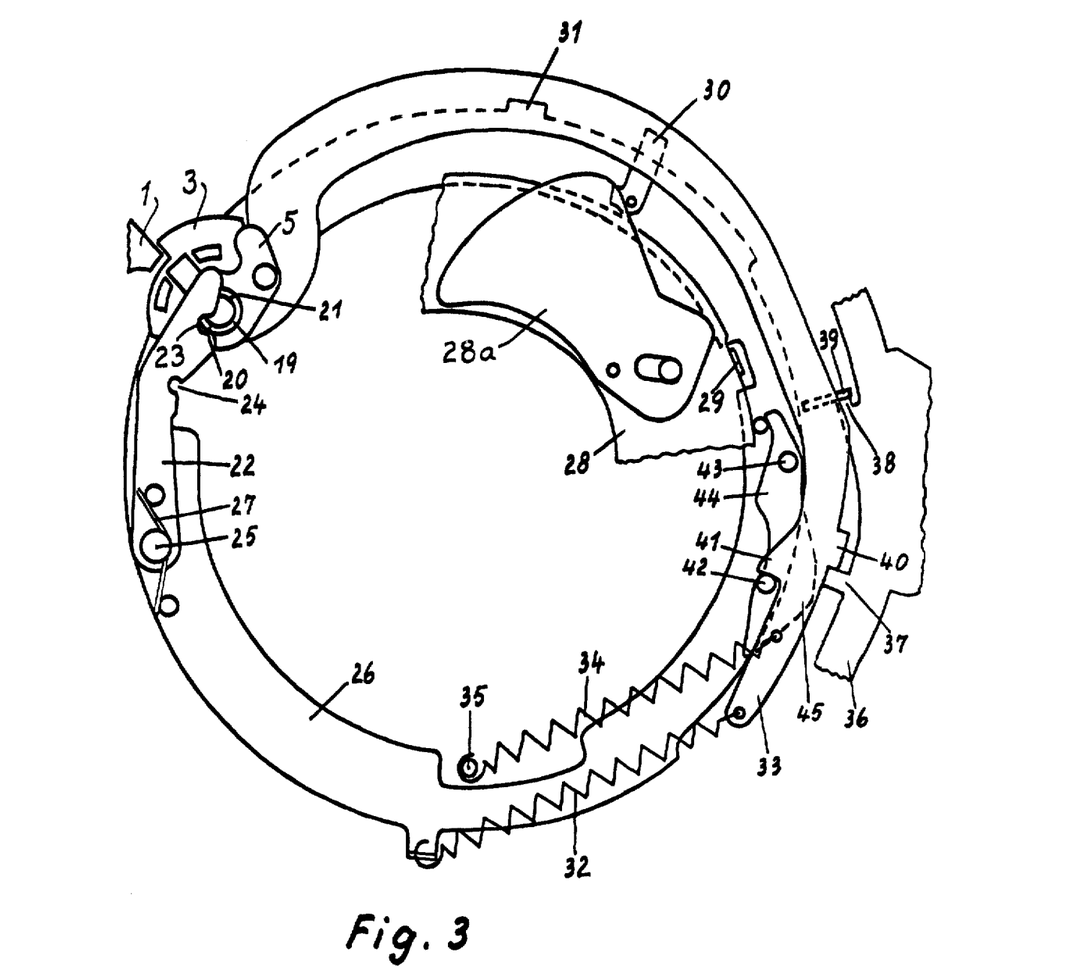
FIG. 3 is a view similar to FIG. 2, showing the parts in tensioned or cocked position ready for making an exposure with the objective shutter.
Figure 4:
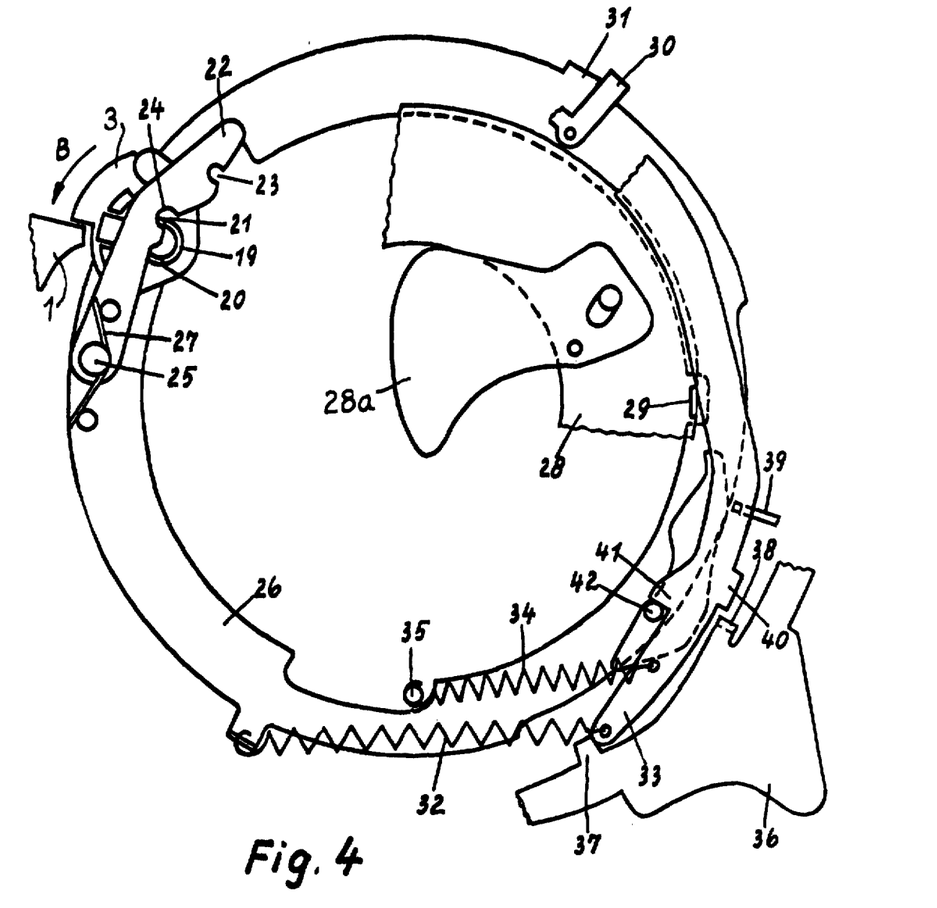
FIG. 4 is a similar view showing the parts in an intermediate position during the running-down motion.

As seen in FIGS. 2–4, the pawl 22 is pivoted at 25 to a control ring 26 rotatable about the optical axis. The pawl is biased by a spring 27 in a clockwise direction on its pivot, to keep the edge thereof which has the notches 23 and 24 in contact with the upstanding part of the hub 19, so as to engage with either the edge 20 or the edge 21 thereof, depending upon the position of the parts.

There is a shutter blade mounting ring 28 rotatable about the optical axis. A plurality of shutter blades 28a (only one being shown for the sake of clarity) are mounted between this mounting ring 28 and a shutter blade actuating ring which is also rotatable about the optical axis but which is not illustrated as such an actuating ring is well known and the details thereof are not important for purposes of the present invention. It is well understood in the art that when it is desired to have objective shutter blades opened and closed for viewing purposes as well as opened and closed for making an exposure, it is convenient to mount them between a rotatable blade mounting ring and a rotatable blade actuating ring, the first ring being rotated to open the blades for viewing purposes and the second ring being rotated for opening the blades for exposure purposes. See, for example, the above mentioned Patent 3,122,078, where such a blade mounting ring or bearing ring is shown at 54 and a blade actuating ring is shown at 56. Such an arrangement is used here in the present construction, and it is believed unnecessary to show further details of these rings or the way the shutter blades are attached to them. The present invention deals with the way the mounting ring 28 is controlled under certain circumstances from the motion of the pivoted member 3, for opening and closing the blades for viewing, and with the way the blade actuating mechanism is released for its running down movement to make an exposure, but is not concerned with the details of the blade actuating ring itself or of the mechanism for driving it to make an exposure, once the mechanism has been triggered or released in accordance with the present invention. The mechanism for driving the blades to make an exposure may be conventional, and it must be tensioned or cocked separately (that is, independently of the tensioning or cocking of the drive mechanism of the camera body, which operates the focal plane shutter and the mirror) when it is desired to make an exposure with the objective shutter.

The control ring 26 and the blade mounting ring 28 are coupled to each other for joint movement in both directions, by an ear 29 on one of these rings engaging in a slot in the other of the rings. The rest or run-down position of these parts is the position shown in FIG. 2, in which the shutter blades 28a are open because of the position of the blade mounting ring 28, the blade actuating ring (not shown) being in its rest or run-down position.

The trip or release member of the objective shutter is shown schematically at 30. As above mentioned, the driving mechanism of the objective shutter, for driving the blade actuating ring first in one direction to open the blades and then in the opposite direction to close the blades, is conventional and not shown. It is sufficient to say that when the release member 30 is turned rightwardly or in a clockwise direction on its pivot, the conventional shutter driving mechanism is released and starts its running down movement to make an exposure. In the present construction, the shutter release member 30 is actuated by a lug 31 on the control ring 26, when the control ring moves in a clockwise direction from the rest position shown in FIG. 2. It will be noted from FIG. 2 that there is, in this position of the parts, a substantial space between the lug 31 and the release member 30. Thus when the control ring 26 begins to turn in a clockwise direction, it does not operate the shutter release 30 until the blades 28a have been closed. When thus released, the shutter drive mechanism runs down to open and close the blades for making the exposure.

The control ring 26 is connected by the spring 32 with one end of an internal tensioning lever 33, the other end of which is pivoted on any suitable pivot such as the pivot pin 2, this lever 33 extending circumferentially through approximately half of the circumference of the control ring 26. A second spring 34, which may be called the drive spring of this part of the mechanism, is also connected at one end to the tensioning lever 33 near the free end thereof, and the opposite end of the spring 34 is connected to the fixed pin 35.

In addition to this internal tensioning lever 33, the optical unit has an external tensioning member 36 which is in the position shown in FIG. 2 when the objective shutter parts are in the rest or run-down position, and which is manually grasped and moved upwardly in a generally circumferential counterclockwise direction when it is desired to cock or tension the objective shutter for making an exposure. During this upward motion of the external tensioning member or cocking handle 36, a projection 37 thereon engages a lug 40 on the tensioning lever 33 and swings the tensioning lever from the position shown in FIG. 2 to the position shown in FIG. 3, thereby stretching or tensioning both of the springs 32 and 34. This movement of the lever 33 occurs a little after a second projection 38 on the cocking handle 36 has engaged a lug 39 on the tensioning ring (not shown) of the drive mechanism of the objective shutter, and has moved this lug 39 and its accompanying tensioning ring to the tensioned position ready for making an exposure with the objective shutter. As already indicated, the drive mechanism of the objective shutter is conventional and the details are unimportant for purposes of the present invention. When the lever 33 reaches its fully tensioned position at the end of the upward movement of the cocking handle 36, the lever 33 becomes latched in tensioned position by means of a projection 41 on the lever 33 engaging behind a latching pin 42 on a latching pawl 44 pivotally mounted at 43 on the control ring 26. One edge 45 of this latching pawl 44 constitutes a curved cam lying in the path of travel of the above mentioned lug 39 on the tensioning ring of the shutter drive mechanism, so that when the tensioning ring runs down from tensioned position toward rest position the lug 39 will engage the cam 45 and swing the latching pawl 44 to release the pin 42 from the shoulder 41, thereby unlatching the lever 33 from the control ring 26.

When the tensioning operation by upward movement of the cocking handle 36 has been completed as above described, the parts will have been moved from the position shown in FIG. 2 to the position shown in FIG. 3. This tensioning operation involves no movement of the control ring 26, which remains stationary during the cocking movement. The ring 26 cannot turn in a counterclockwise direction at this time, in spite of the pull of the spring 32, because the ring 26 is already at the counterclockwise limit of its motion. It cannot turn in a clockwise direction at this time, because the notch 23 of the lever 22 is engaged with the edge 20 of the hub 19, effectively latching the control ring against clockwise movement. It will be remembered from what has been said above that in this position of the control ring 26, the shutter blades 28a are open, and in this position of the parts 3, 5, and 14, the diaphragm leaves 11a are likewise fully open. The focal plane shutter is closed, and the reflex mirror is down in its viewing position.

If the operator now wishes to make an exposure with the objective shutter, he first adjusts the focal plane shutter mechanism on the camera body (in the conventional way) to set it for a relatively long exposure, to make sure that the focal plane shutter will be fully open during the entire time of the exposure to be made by the objective shutter. Then he operates the conventional release or trigger on the camera body, just as he would do if he were making an exposure with the focal plane shutter and if the objective shutter were not even present on the camera. Of course the driving mechanism in the camera body must have been cocked or tensioned previously, but this is the usual conventional situation and is no different when the camera is equipped with the objective shutter of the present invention than it is when the camera is equipped with only the focal plane shutter.

Upon actuation of the camera release, the conventional driving mechanism in the camera body starts to run down in the usual conventional way. First the reflex mirror swings upwardly in the usual way, out of the path of light traveling toward the film, but for the moment the focal plane shutter remains closed so that light does not reach the film. As the mirror swings up, the control part 1 on the camera body, previously in the position shown in FIGS. 1, 2, and 3, swings down to the position shown in FIG. 4, thereby allowing the member 3 to turn counterclockwise on its pivot 2, in the direction of the arrow B, from the position shown in FIGS. 1–3 to the position shown in FIG. 4. This allows the blade drive ring 11 to turn to close the diaphragm leaves 11a down to the preselected aperture. It also turns the hub 19 in a counterclockwise direction, thereby withdrawing the edge 20 from the notch 23 of the lever 22, so that the control ring 26 is no longer latched in its counterclockwise position by the lever 22 but can now turn clockwise under the influence of the spring 34 pulling clockwise on the lever 33 and thereby, through the shoulder 41 and pin 42, exerting clockwise force on the control ring 26.

The clockwise movement of the control ring 26 carries the blade mounting ring 28 clockwise with it, thereby closing the shutter blades 28a to the position shown in FIG. 4, the blade operating ring (not shown) meanwhile remaining stationary.

Just as the control ring 26 reaches its clockwise limit of travel, the shutter blades 28a now having reached closed position, the lug 31 on the control ring engages the objective shutter release or trigger 30 and releases it, so that the conventional driving mechanism of the objective shutter starts its running down movement. At the end of the clockwise movement of the control ring 26, the second notch 24 of the lever 22 enters into latching engagement with the second control edge 21 of the hub 19, to hold the ring 26 latched in its clockwise limit position.

The conventional running down movement of the driving mechanism of the objective shutter starts, as above stated, when the lug 31 operates the shutter release 30. This running down movement turns the conventional blade actuating or driving ring of the shutter in the conventional way, first in one direction and then in the other, to open and then to close the shutter blades 28a, the blade mounting ring 28 meanwhile remaining stationary. The timing of the running down movement of the mechanism within the camera body is so related to the timing of running down movement of the objective shutter driving mechanism that the focal plane shutter in the camera body opens fully just before the exposure opening movement of the objective shutter blades commences, and the focal plane shutter (having previously been set for a relatively long exposure) remains fully open until the objective shutter exposure has been completed and the blades have closed again.

Near the end of the running down movement of the driving mechanism of the objective shutter, the lug 39 reaches the cam portion 45 of the latching lever 44, and swings this latching lever 44 to release the pin 42 from behind the shoulder 41 of the lever 33. The spring 34 is now out of action so far as any influence on the control ring 26 is concerned, but the spring 32 is still tensioned and seeks to turn the control ring 26 in a counterclockwise direction. However, the ring 26 cannot turn counterclockwise at this time, because it is latched in its clockwise position by engagement of the notch 24 with the edge 21 of the hub 19. The parts at this time are in the position shown in FIG. 5, where the exposure by the objective shutter has been completed, the objective shutter blades are still closed, the lever 33 has been unlatched from the control ring 26, but the control ring is still latched in its clockwise position by means of the notch 24 engaging the edge 21 of the hub 19.

Figure 5:
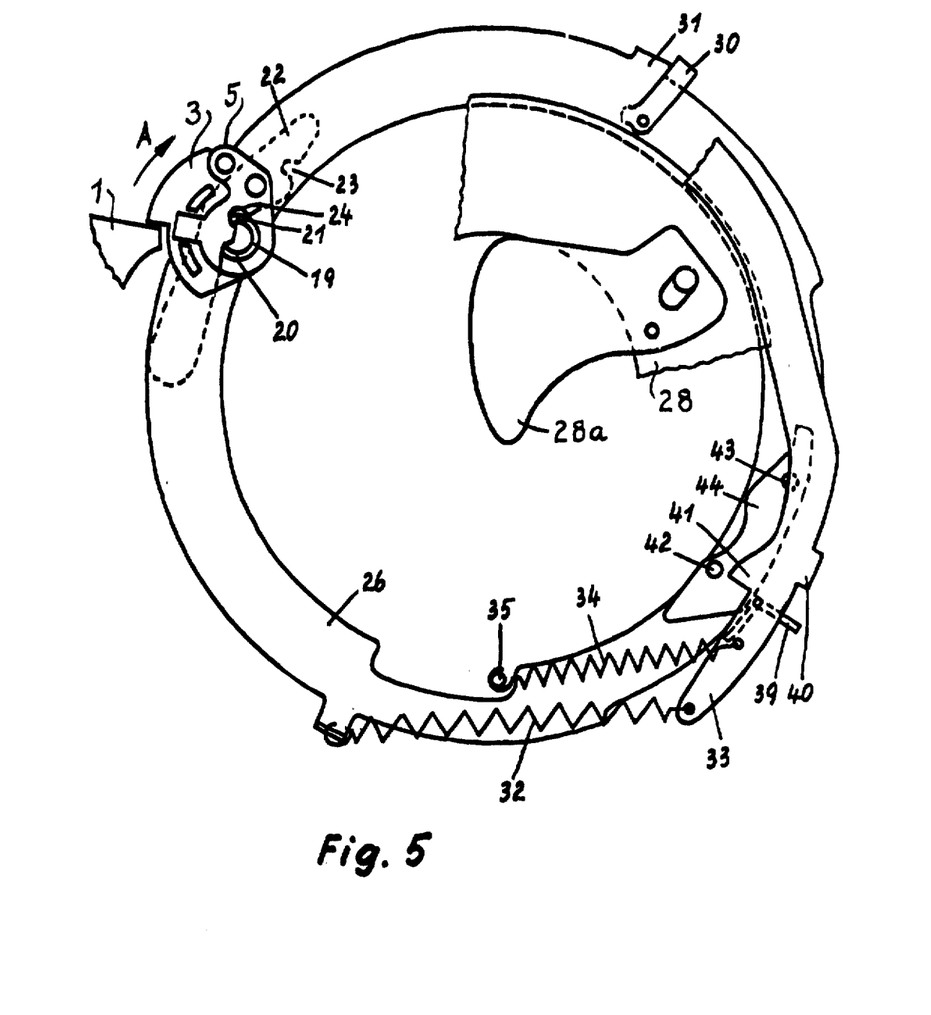
FIG. 5 is a similar view of the parts in a later intermediate position, with the exposure completed but with the shutter blades and diaphragm leaves not yet opened for viewing the image.

The continued running down of the mechanism within the camera closes the focal plane shutter so as to protect the film from further light, and then swings the mirror downwardly to viewing position, at the same time moving the camera member 1 upwardly to engage the shoulder 4 of the member 3 in the optical unit, to swing the member 3 clockwise in the direction of the arrow A from the position of FIG. 5 back to the position of FIGS. 1 and 2. This clockwise swinging of the member 3 causes corresponding clockwise turning of the member 5 so that the pin 16 thereon turns the lever 14 clockwise, thereby swinging the diaphragm adjusting ring 11 counterclockwise to open the diaphragm wide. The corresponding clockwise turning of the hub 19 withdraws the latching edge 21 of the hub from the notch 24 of the member 22, thus unlatching the control ring 26 so that the spring 32 now draws the control ring in a counterclockwise direction back from the position shown in FIGS. 4 and 5 to its initial position shown in FIGS. 2 and 3. This counterclockwise movement of the control ring 26 carries the shutter blade mounting ring 28 correspondingly counterclockwise with it, opening the shutter blades 28a for viewing purposes.

The parts are now ready for cocking or tensioning for the next exposure. The drive mechanism of the camera needs to be cocked in the usual way for every exposure, whether it is to be made by the focal plane shutter or by the objective shutter. The drive mechanism of the objective shutter, however, needs to be cocked (by the cocking handle 36) only if the exposure is to be made by the objective shutter rather than the focal plane shutter. If the objective shutter has not been cocked by the handle 36 in advance of an exposure, the control ring 26 and associated parts will remain in the position shown in FIG. 2 during the exposure, with the objective shutter blades fully open, and the exposure will be made entirely by the focal plane shutter in the camera, without operation of the objective shutter. Of course the diaphragm will close down to the preselected aperture, at every exposure operation of the camera, regardless of whether the objective shutter mechanism has or has not been tensioned.

In some cameras, the normal running down time of the camera drive mechanism, from the moment when the member 1 on the camera body is moved downwardly (to allow movement of the member 3 on the optical unit) to the moment when the focal plane shutter completes its opening movement, is equal to or very slightly less than the running down time of the mechanism in the optical unit, from the moment that the member 3 turns counterclockwise to the moment that the objective shutter blades begin to open for the exposure. With this relative timing of the camera mechanism and the objective unit mechanism, no special delaying means is necessary on the objective unit. Some cameras, however, are slower in operation, so that the objective shutter might start its exposure opening movement before the focal plane shutter is open. When the objective unit is to be used with such a camera, having a relatively slow running down time, then a suitable delaying or retarding device, of conventional known construction, can be incorporated in the drive mechanism of the objective shutter in the optical unit, to make sure that the objective shutter will not start its opening movement for an exposure until the focal plane shutter in the camera has had a chance to open. With certain known forms of camera, a pre-timer or preliminary retarding device in the optical unit, giving a delay of about 150 milliseconds between the actuation of the shutter release 30 and the commencement of running down of the master member which drives the shutter blade actuating ring is found to be desirable.

It should be noted that with the above described mechanism in the optical unit the coupling of the diaphragm to the mirror in the camera is fully effective under all conditions regardless of whether the objective shutter mechanism is or is not cocked or tensioned for making an objective shutter exposure. Regardless of the objective exposure operation the diaphragm is opened up to maximum aperture when the mirror in the camera is swung down to viewing position and is closed down to the preselected aperture whenever the mirror is swung up to picture taking position.

It may also be noted that if the optical unit is a detachable and interchangeable unit, and if it happens to be taken off of the camera at a time when the objective shutter is in cocked condition, the objective shutter mechanism will immediately begin to run down while the optical unit is being removed from the camera, but this will have no effect on the focal plane shutter in the camera and thus no incorrect exposure will be made. If the optical unit is cocked after it has been removed from the camera, it will not stay cocked but will immediately run down when the cocking force on the handle 36 is removed. The objective shutter mechanism will stay cocked only if it is cocked while the optical unit is properly attached to the camera body, with the part 1 of the camera body in position to prevent the part 3 of the optical unit from turning counterclockwise.

In case the operator cocks the objective shutter mechanism while it is attached to the camera, and then changes his mind and decides he would rather take the next picture by using the focal plane shutter rather than the objective shutter, he can do this by temporarily removing the optical unit from the camera (assuming that it is a detachable unit) to allow it to run down, and then attaching it again to the camera. Also it is possible, if desired, to provide a lever on the optical unit which can be actuated to disengage the latching pawl 22 from the hub 19, to allow the objective shutter to run down without affecting any of the parts in the camera and without making an exposure.

In the simple form of the present invention, as described above, it will be noted that there are no extra connections between the camera body and the optical unit, other than the contact of the part 1 on the camera body with the part 3 on the optical unit, this connection being provided in any event, for operating the diaphragm between its fully open viewing position and its stopped-down preselected aperture position. This simple form of the invention is very satisfactory and efficient, but it does require the operator to remember to set the focal plane shutter for a relatively slow or long exposure, when he intends to take a picture by means of the objective shutter. If it is desired, however, to make the construction fool-proof, so that the operator cannot forget to set the focal plane shutter for a sufficiently long exposure when using the objective shutter, then it is possible, at the cost of some additional expense and complexity, to provide an interlock between the optical unit and the camera body, to insure a long enough opening of the focal plane shutter when the objective shutter is used. The construction of such an interlock forms a separate invention and is not here disclosed.

It is recognized in the art that only slight forces are necessary for opening the diaphragm leaves for viewing purposes and closing them down to the preselected aperture when viewing is completed and the exposure is to be made. Therefore, in focal plane cameras of this type, the transmission mechanism up to and including the part 1 on the camera body, which controls the opening and closing of the diaphragm aperture, is adapted to transmit only relatively slight forces. One of the noteworthy features of the present invention is that the operation of the objective shutter can be adequately controlled by the use of these same slight forces transmitted from the camera body to the optical unit, so that the use of an objective shutter according to the present invention does not impose any appreciable extra loading or resistance on the movements of the member 1 on the camera body, and thus does not interfere in any way with delicate parts in the camera body which cause the movement of the member 1, nor interfere with any safety features or blocking features which may be included in the camera and which lead up to movements of the member 1.

It is to be understood that the disclosure is given by way of illustrative example only, rather than by way of limitation.

What is claimed is:

1. An optical unit for use with a single lens pivoted mirror reflex camera having a focal plane shutter, said optical unit comprising an adjustable diaphragm, and a movable member whose movements are controlled by movement of a movable part on the camera for adjusting said diaphragm to maximum aperture when the camera is in condition for viewing a scene and adjusting said diaphragm to a smaller aperture when the camera is in condition for making an exposure, characterized by the fact that said optical unit includes an objective shutter of the type requiring to be tensioned before an exposure operation and having a running down movement from tensioned position to rest position to make an exposure in the course of such running down movement, the shutter having blades which are open for viewing purposes both in the tensioned position and in the rest position, and means for controlling operation of said objective shutter from movements of said movable member, said last named means including means for causing a first closing movement of the blades of said objective shutter while the focal plane shutter of the associated camera is closed, means for thereafter causing a running down exposure-making movement of said objective shutter while the focal plane shutter of the associated camera is open, and means for thereafter causing an opening movement of the blades of said objective shutter when the focal plane shutter of the associated camera is again closed.

2. A construction as defined in claim 1, further characterized by the fact that said objective shutter is optionally settable to a cocked condition ready for an exposure-making running down movement when it is desired to make an exposure timed by said objective shutter and may be left in a run-down uncocked condition when it is desired to make an exposure timed by the focal plane shutter in the associated camera rather than by said objective shutter, said objective shutter having blades which are open in a viewing position when said objective shutter is in cocked condition and when it is in run-down uncocked condition, said construction being further characterized by the fact that said means for controlling operation of said objective shutter from movements of said movable member includes means effective upon movement of said movable member from maximum aperture position to smaller aperture position, if said objective shutter is then in cocked condition, for moving said blades from open viewing position to closed position and for causing the objective shutter thereafter to open and close said blades to make an exposure, and means effective thereafter upon movement of said movable member back from smaller aperture position to maximum aperture position for moving said blades from closed position to open viewing position.

3. A construction as defined in claim 1, wherein said means for controlling operation of said objective shutter from movements of said movable member includes a control member movable in a first direction from a first position to a second position and movable in a second direction from said second position to said first position, said control member being effective during movement in said first direction to cause said objective shutter to make an exposure, movement of said control member in said first direction being initiated by movement of said movable member from maximum aperture position to smaller aperture position.

4. A construction as defined in claim 1, wherein said means for controlling operation of said objective shutter from movements of said movable member includes a control member movable in a first direction from a first position to a second position and movable in a second direction from said second position to said first position, said control member being effective during movement in said first direction to close said objective shutter from an open viewing position to a closed position and thereafter to cause said objective shutter to open and close to make an exposure, and effective during movement in said second direction to open said objective shutter to a viewing position.

5. A construction as defined in claim 4, wherein movement of said control member in said first direction is initiated by movement of said movable member from maximum diaphragm aperture position to smaller aperture position, and movement of said control member in said second direction is initiated by movement of said movable member from smaller aperture position to maximum aperture position.

6. A construction as defined in claim 1, wherein said means for controlling operation of said objective shutter from movements of said movable member includes a control member movable between two positions, and wherein said movable member includes a tubular hub cut away through part of its periphery to provide two axially extending edges, and a latching pawl pivoted to said control member and engaging one of said edges to latch the control member in one of its positions while said movable member is in maximum diaphragm aperture position and engaging the other of said edges to latch the control member in the other of its positions while said movable member is in smaller aperture position.

7. A construction as defined in claim 1, in which said means for controlling operation of said objective shutter from movements of said movable member includes a shutter release member (30) for releasing said objective shutter for running down movement from tensioned position to rest position, a control ring (26) rotatable in said optical unit between a first position and a second position, said control ring being operatively connected (29, 28) to said shutter blades to open said blades for viewing when said ring is in its first position and to close said blades as said ring moves from its first position to its second position, a first spring (34) tending to move said control ring from its first position to its second position, a second spring (32) tending to move said control ring from its second position to its first position, a tensioning member (36) movable to tension said objective shutter ready for a running down movement and concomitantly to tension both of said springs and to render said second spring temporarily ineffective to turn said ring, control ring latch means (20, 22, 23) initially effective to hold said control ring in its first position notwithstanding the force of said first spring (34) tending to move said control ring to its second position, said latch means being unlatched by movement of said movable member (3, 5) from maximum diaphragm aperture position to smaller aperture position so that said first spring may then turn said control ring from its first position to its second position, latch means (21, 22, 24) effective when said ring reaches its second position for temporarily holding said ring in its second position, a part (31) on said control ring for releasing said shutter release member (30) during movement of said control ring from first position to second position so that said objective shutter may make its running down movement, means (39, 44, 42, 33) operated by the running down movement of said objective shutter for rendering said first spring (34) ineffective and said second spring (32) effective to act on said control ring, and means effective upon movement of said movable member (3, 5) from smaller diaphragm aperture position to maximum aperture position for unlatching said last mentioned latch means (21, 22, 24) so that said second spring may then turn said control ring from its second position to its first position.

8. A diaphragm and shutter unit for use with a single lens pivoted mirror reflex camera having a focal plane shutter, said unit comprising a diaphragm adjustable to apertures of different sizes, said diaphragm being spring biased toward an aperture of smaller size, a rotary diaphragm control member operated in synchronism with swinging movements of the pivoted mirror in the camera, said rotary control member being coupled to said diaphragm to open said diaphragm to an aperture of larger size when said rotary control member is turned in a first direction and to allow said diaphragm to close down to an aperture of smaller size under the influence of its spring bias when said rotary control member is turned in a second direction, an objective shutter having operating mechanism capable of being moved from a run-down position to a tensioned position, said shutter remaining open in both the run-down position and the tensioned position of said operating mechanism, said shutter operating mechanism being effective only if said operating mechanism is then in at least partially tensioned condition and including means activated by turning said rotary control member in said second direction for first closing said objective shutter, and then opening and closing said objective shutter to make an exposure, and means activated by thereafter turning said rotary control member in said first direction for reopening said objective shutter for viewing.

9. A construction as defined in claim 8, wherein said shutter operating mechanism includes a control ring (26) effective upon turning movement in a first direction from a first position to a second position to close the objective shutter if it is previously open and effective upon turning movement in a second direction from said second position to said first position to open the objective shutter, a first spring (34) tending to turn said control ring in said first direction to close said shutter, a second spring (32) tending to turn said control ring in said second direction to open said shutter, a shutter release member (30) actuated by movement of said control ring in its first direction and effective when actuated to cause the shutter to open and close for making an exposure, and latch means (22, 23, 24) latching said control ring to said rotary diaphragm control member (3, 5, 19), said latch means initially holding said control ring in said first position against the force of said first spring, movement of said rotary control member in its second direction releasing said latch means so that said first spring may turn said control ring in its first direction to close said objective shutter and then to actuate said shutter release member to make an exposure, said latch means then latching said control ring in its second position, movement of said rotary control member thereafter in its first direction releasing said latch means again so that said second spring may turn said control ring in its second direction to open said objective shutter for viewing.

References Cited
UNITED STATES PATENTS 2,992,602  7/1961  Heden _______________ 95—42

SAMUEL S. MATTHEWS, Primary Examiner

K. C. HUTCHISON, Assistant Examiner

U.S. Cl. X.R.

95—55